US011940126B2

(12) United States Patent
Schott et al.

(10) Patent No.: US 11,940,126 B2
(45) Date of Patent: Mar. 26, 2024

(54) PETAL MECHANISM FOR LIGHT FIXTURE

(71) Applicant: Gschott Ventures LLC, Chicago, IL (US)

(72) Inventors: Jacob Daniel Schott, Chicago, IL (US); John Geletka, Riverside, IL (US)

(73) Assignee: Gschott Ventures LLC, Chicago, IL (US)

(*) Notice: Subject to any disclaimer, the term of this patent is extended or adjusted under 35 U.S.C. 154(b) by 0 days.

(21) Appl. No.: 17/955,172

(22) Filed: Sep. 28, 2022

(65) Prior Publication Data

US 2023/0112846 A1 Apr. 13, 2023

Related U.S. Application Data

(60) Provisional application No. 63/250,393, filed on Sep. 30, 2021.

(51) Int. Cl.
*F21V 14/08* (2006.01)
*F21V 1/12* (2006.01)

(52) U.S. Cl.
CPC ................ *F21V 14/08* (2013.01); *F21V 1/12* (2013.01)

(58) Field of Classification Search
CPC .................................. F21V 14/08; F21V 1/12
See application file for complete search history.

(56) References Cited

U.S. PATENT DOCUMENTS

2008/0311316 A1* 12/2008 Marlow ................ A41G 1/002 251/5
2010/0014291 A1* 1/2010 Ben Natan ............. F21V 11/10 362/277
2010/0307569 A1* 12/2010 Sui ........................ A41G 1/002 136/252
2012/0121826 A1* 5/2012 Marlow ................ A41G 1/001 428/24
2016/0311488 A1* 10/2016 Teitel ....................... F21S 9/02
2017/0112241 A1* 4/2017 Fukui ..................... A44C 17/02
2018/0008902 A1* 1/2018 Fung ...................... A63H 33/26

* cited by examiner

*Primary Examiner* — Christopher E Dunay
(74) *Attorney, Agent, or Firm* — Howard & Howard Attorneys PLLC

(57) ABSTRACT

A light fixture includes a lamp having a light source, a petal mechanism having a plurality of petals moveable between an open position and a closed position, and a petal actuator coupled to the petal mechanism to controllably move the petals of the petal mechanism between the open position and the closed position.

18 Claims, 9 Drawing Sheets

PETAL MECHANISM FOR LIGHT FIXTURE

CROSS-REFERENCE TO RELATED APPLICATION(S)

The present application claims the benefit of and priority to U.S. Provisional Patent Application Ser. No. 63/250,393, filed Sep. 30, 2021, the entire disclosure of which is hereby expressly incorporated by reference.

FIELD OF THE INVENTION

The present invention relates generally to light fixtures and, more specifically, to a petal mechanism with a plurality of petals moveable between open and closed positions.

BACKGROUND OF THE INVENTION

Light fixtures may be generally utilized to provide illumination for a variety of purposes, e.g., to provide illumination for a variety of tasks or to enhance the environment. In addition, the nature of the light, for example, the intensity, emitted by a light fixture may be dependent upon the specific nature of the light and may change based on, for example, the time of day.

The present invention is aimed at solving one or more of the problems identified above.

SUMMARY OF THE INVENTION

The present invention provides a light fixture including a lamp having a light source, a petal mechanism having a plurality of petals moveable between an open position and a closed position, and a petal actuator coupled to the petal mechanism to controllably move and hold the petals of the petal mechanism between the open position and the closed position.

Other advantages of the present invention will be readily appreciated as the same becomes better understood by reference to the following detailed description when considered in connection with the accompanying drawings. Non-limiting and non-exhaustive embodiments of the present disclosure are described with reference to the figures, wherein like numerals refer to like parts throughout the various views unless otherwise specified.

DETAILED DESCRIPTION OF INVENTION

Figure 1:
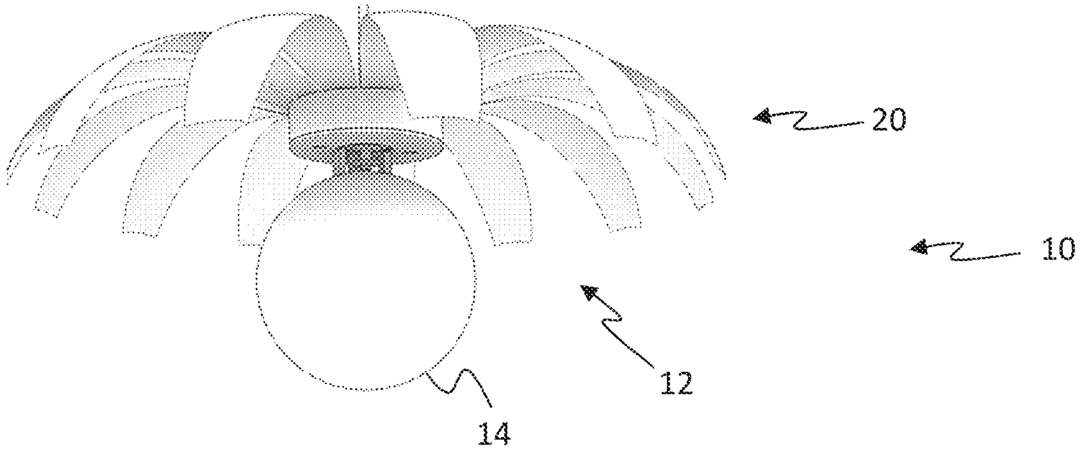
FIG. 1 is a perspective view of a light fixture having a petal mechanism in a fully open position and a lamp, according to a first embodiment of the present invention.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment of example is included in at least one embodiment of the present invention. Thus, appearances of the phrases "in one embodiment", "in an embodiment", "one example", or "an example" in various places throughout this specification are not necessarily all referring to the same embodiment or example. Furthermore, the particular features, structures, or characteristics may be combined in any suitable combinations and/or sub-combinations in one or more embodiments or examples. It should be appreciated that the figures provided herewith are for explanation purposes to persons ordinarily skilled in the art and that the drawings are not necessarily drawn to scale.

Referring to the drawings, wherein like numerals indicate like or corresponding parts throughout the several views, an embodiment of a light fixture 10 includes a lamp 12. The lamp 12 includes a light source (not shown) and a diffuser 14. In the illustrated embodiment, the diffuser 14 is in the shape of a globe. However, the present invention is not limited to any specific shape of the diffuser 14 and may be either a regular shape, such as a cube or an irregular shape. The diffuser 14 may be made of a translucent material, such as glass, frosted glass, plastic, or other transparent or semi-transparent material. The light source may be any suitable light source, but preferably, a light emitting diode (LED) element. In one embodiment of the present invention, the light source has one or more adjustable parameters, the intensity, and/or color of the light emitted. It should be appreciated that the light source is "ON" when emitting light and is "OFF" when not emitting light.

The light fixture 10 also includes a petal mechanism 20. As discussed in more detail below, the petal mechanism 20 is adjustable to modify the light being emitted from the light fixture 10. In various embodiments, the petal mechanism 20 may be manually adjusted via a control application or "app" that is being executed on a user device, such as a cell phone, computer, tablet, or wall-mounted fixture. The app may additionally be programmed or configured to automatically control the petal mechanism 20 based on one or more other factors, e.g., time of day or one or more other sensed parameters, such as the presence of one or more people, light, or sound.

Figure 2:
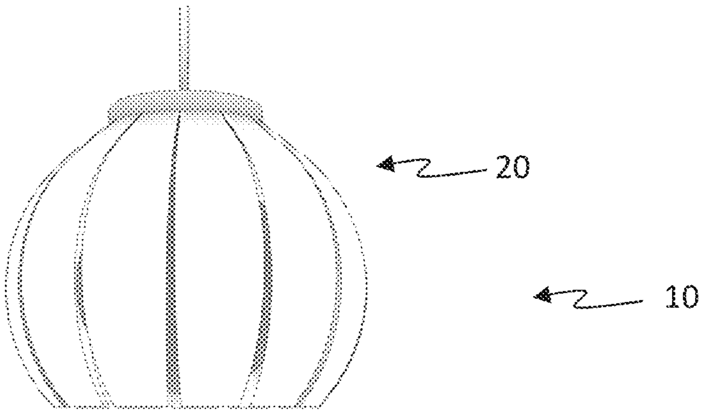
FIG. 2 is another perspective view of the light fixture of FIG. 1 with the petal mechanism in a closed position.
Figure 3:
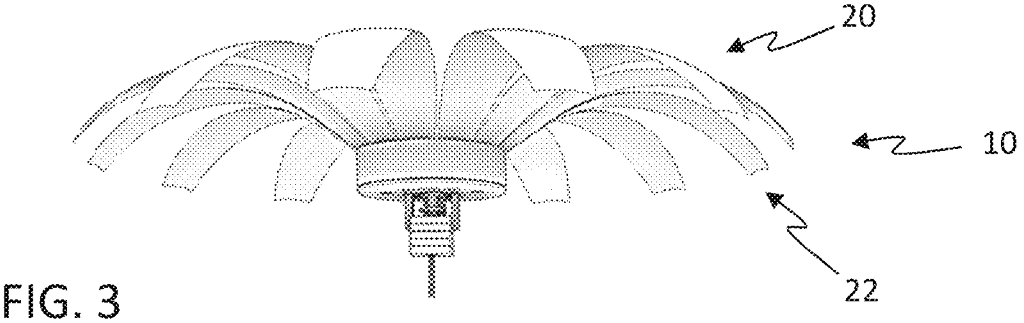
FIG. 3 is a perspective view of the petal mechanism of FIG. 1 in a fully open position.

With reference to FIGS. 1 and 2, the petal mechanism 20 has an open position and a closed position. The petal mechanism 20 may include a plurality of petals 22 that are moveable between first and second positions. As shown in FIG. 1, in the illustrated embodiment, the petals 22 are in the first position when the petal mechanism 20 is in the open position. Further, as shown in FIG. 2, the petals 22 are in the second position when the petal mechanism 20 is in the closed position. In one aspect of the present invention, the petals 22 may be made from an opaque material, such as wood, plastic, fabric, or metal.

In one embodiment, in the closed position, a gap 24 between adjacent petals 22 may exist. Thus, when the light source is "ON" and the petal mechanism 20 is in the closed position (and the petals 22 in the second position as shown in FIG. 2), light from the light fixture 10 is visible.

Figure 4:
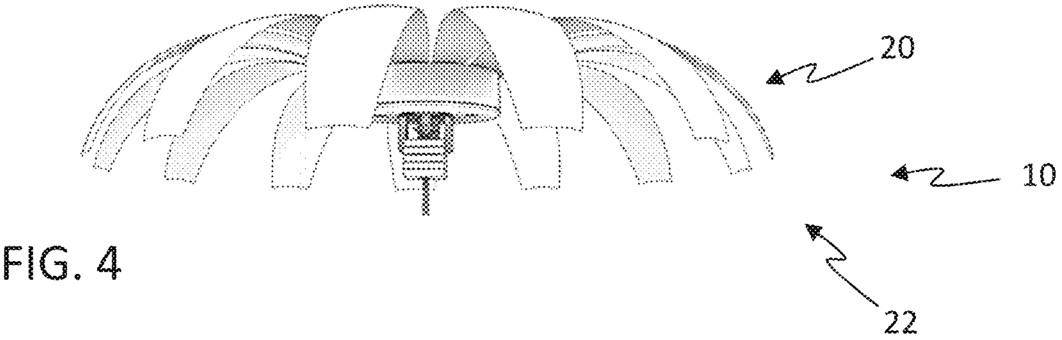
FIG. 4 is a perspective view of the petal mechanism of FIG. 1 in a first intermediate position.
Figure 5:
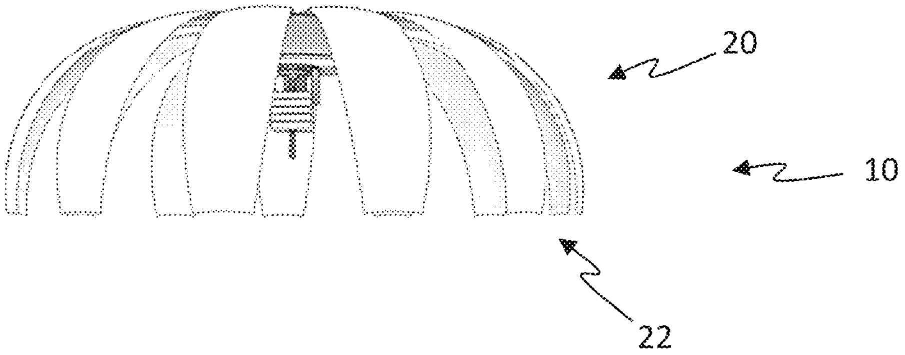
FIG. 5 is a perspective view of the petal mechanism of FIG. 1 in a second intermediate position.
Figure 6:
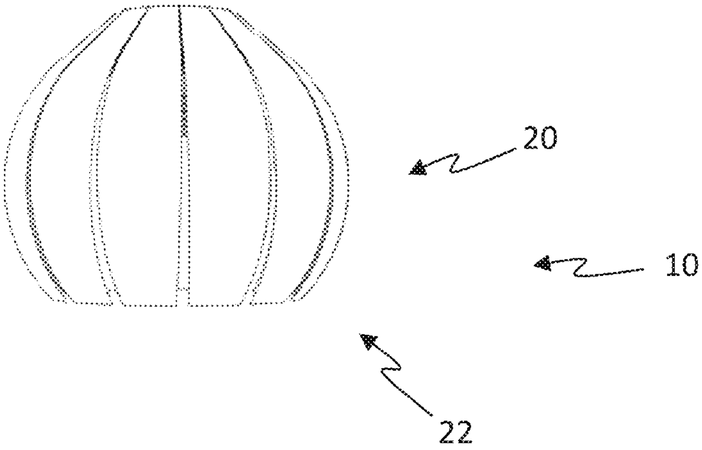
FIG. 6 is a perspective view of the petal mechanism of FIG. 1 in a closed position.
Figure 7:
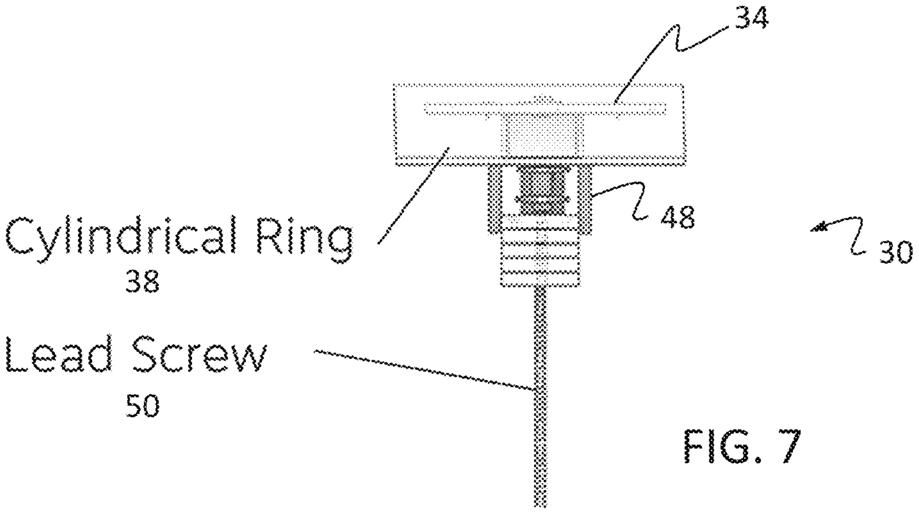
FIG. 7 is a first side view of a petal actuator of the petal mechanism, according to an embodiment of the present invention.
Figure 8:
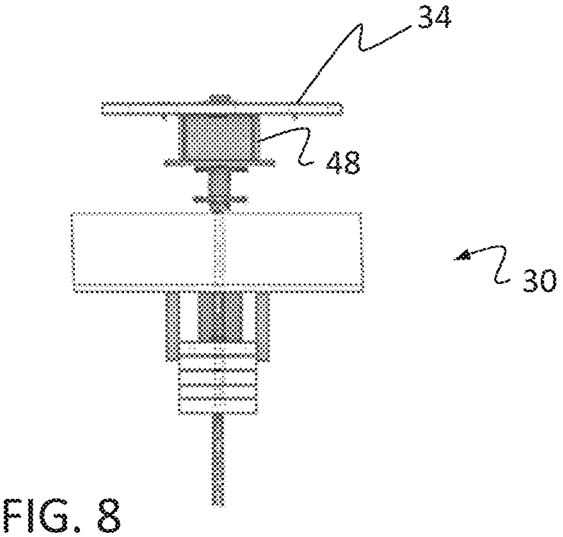
FIG. 8 is a second side view of a petal actuator of the petal mechanism, according to an embodiment of the present invention.
Figure 9:
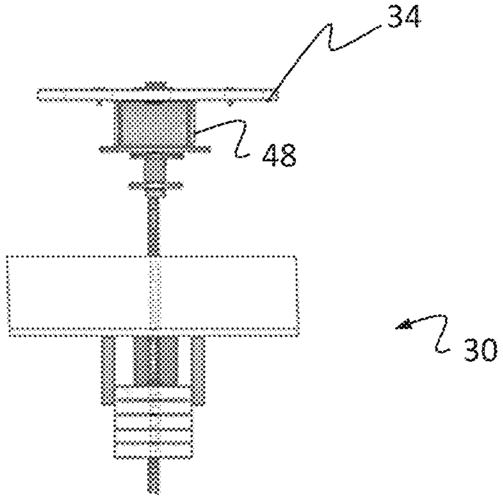
FIG. 9 is a third side view of a petal actuator of the petal mechanism, according to an embodiment of the present invention.

In one embodiment of the present invention, the petal mechanism 20 is infinitely adjustable between the open and closed positions. In another embodiment of the present invention, the petal mechanism 20 is a preset number of stops between the open and closed positions. With reference to FIGS. 3, 4, 5 and 6, the petals 22 of the petal mechanism 20 are shown in the first position (FIG. 1) and the closed position (FIG. 6) and first and second intermediate positions (FIGS. 4 and 5, respectively).

With reference to FIGS. 7-14, in one embodiment, the petal mechanism 20 includes a petal actuator 30. The petal actuator 30 is configured to controllably act upon the petals 22 to move the petals 22 between the first position and the second position. In general, the petal mechanism 20 includes a motor 48 that turns a central lead screw 50 to move a cone that works against a proximal end of each petal 22. In the illustrated embodiment, the petal mechanism 20 includes thirteen (13) petals 22, however, any number of petals 22 may be used.

Figures 10, 11:
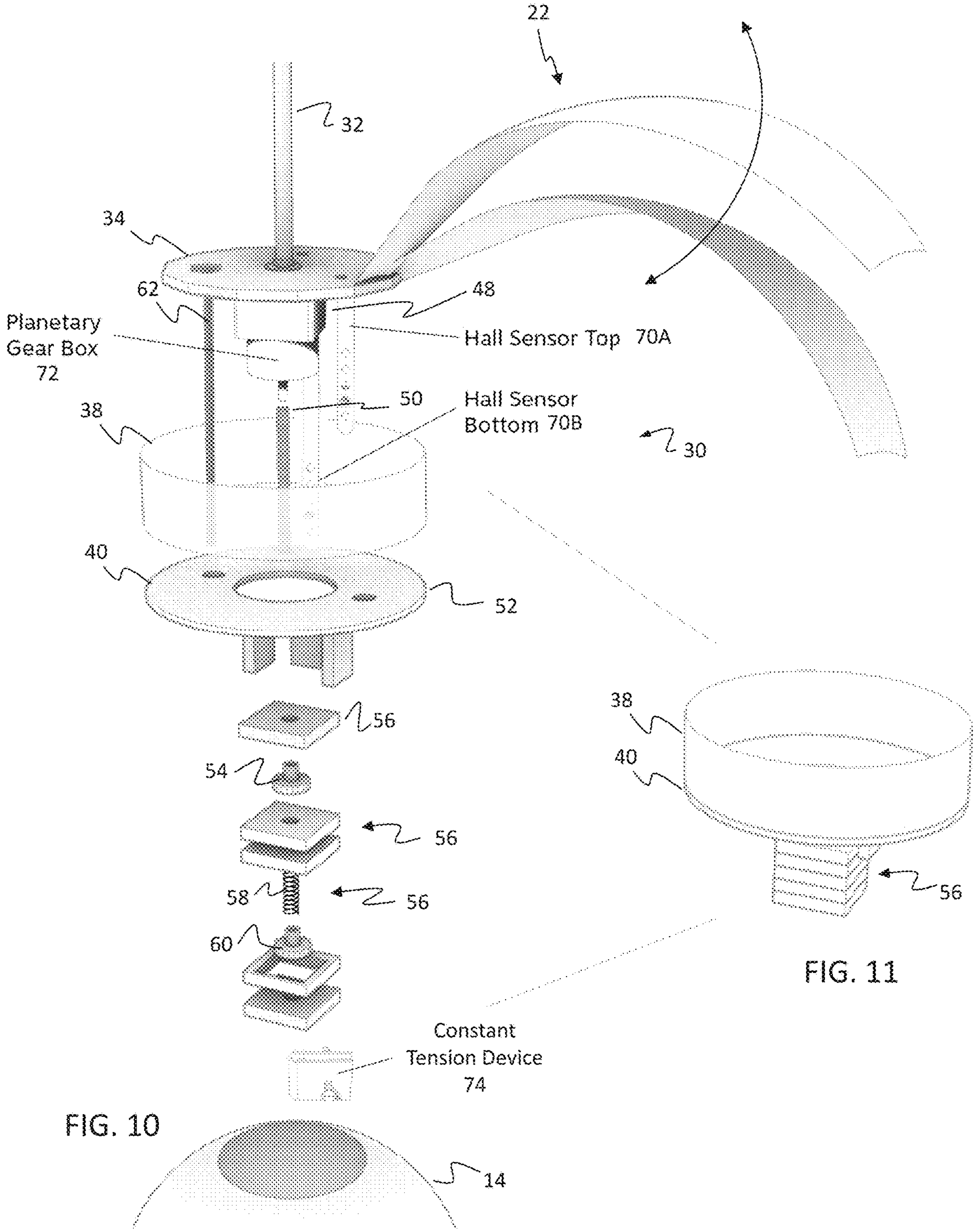
FIG. 10 is an exploded perspective view of the petal actuator of FIG. 7.
FIG. 11 is a perspective view of the petal actuator of FIG. 7.
Figure 12:
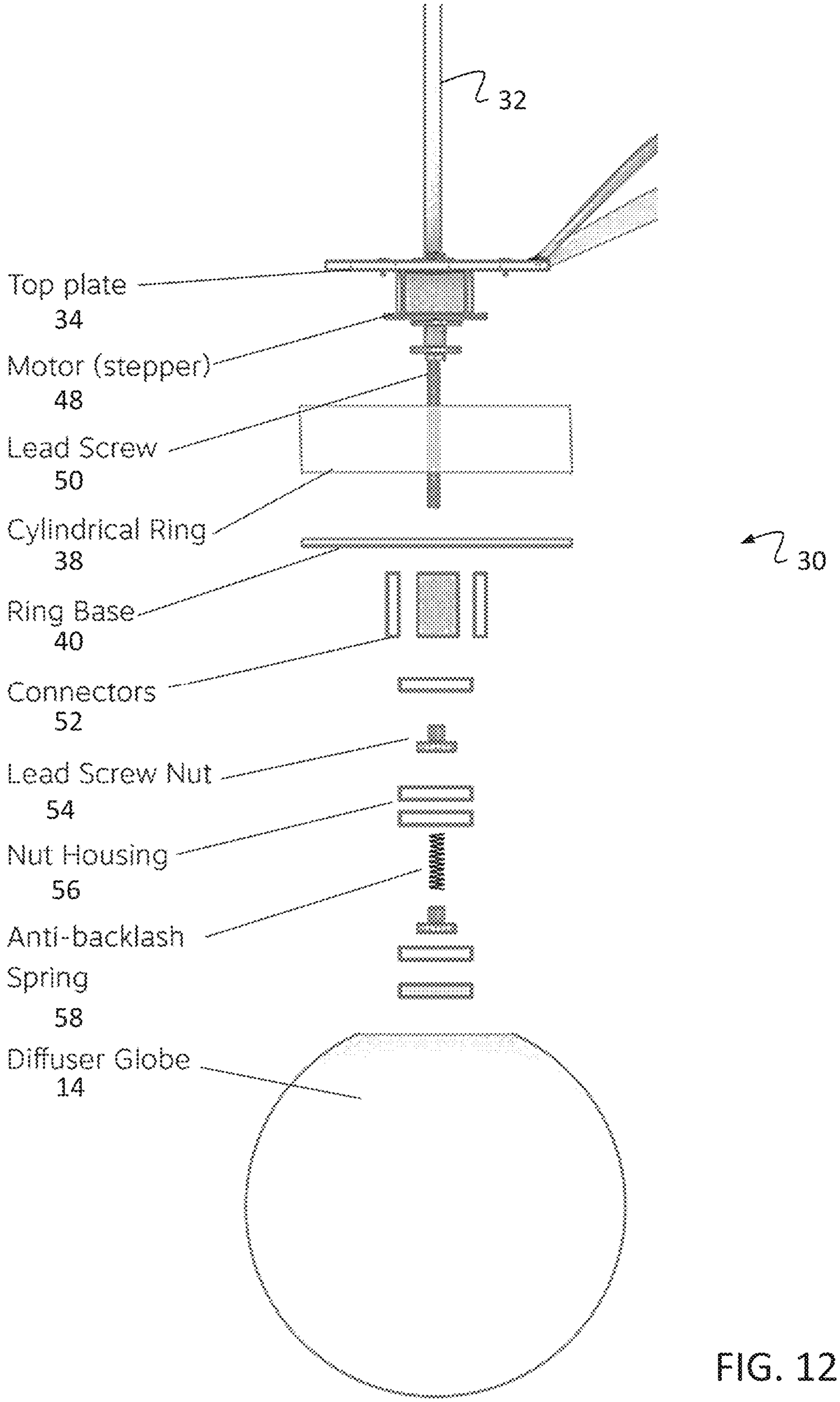
FIG. 12 is an exploded view of the petal mechanism of FIG. 1.

In the illustrated embodiment, the petal actuator 30 includes a top plate 34. In the illustrated embodiment, the petal mechanism 20 includes a plurality of hinges 34 to couple a respective petal 22 to the top plate 34. For illustrative purposes, only two petals 22 are shown in FIGS. 10 and 12.

Electrical power is provided to the light fixture 10 via a power cord 32. In the illustrated embodiment, the power cord 32 enters the petal actuator 30 through a center of the top plate 34. Electrical power delivered to the light fixture 10 is used to power the lamp 12 as well as the petal actuator 30 (see below).

The petal actuator 30 may include a cylindrical ring 38 and a ring base 40. As discussed in further detail below, the petal actuator 30 controllably raises and lowers the cylindrical ring 38 along an axis 42. The petals 22 rests along a top edge 44 of the top plate 34. As the cylindrical ring 38 is raised upward, the top edge 44 of the top plate 34 acts against a lower side of each petal 22 causing the petals 22 to move toward the first position (shown in FIGS. 1 and 3). Since the petals 22 rest along the top edge 44 of the top plate 34, the petals 22 are lowered or moved towards the second position (shown in FIGS. 2 and 6) as the cylindrical ring 38 is lowered. In the illustrated embodiment, the petals 22 are raised and lowered simultaneously or synchronously, as shown in FIGS. 3-6.

Figure 15:
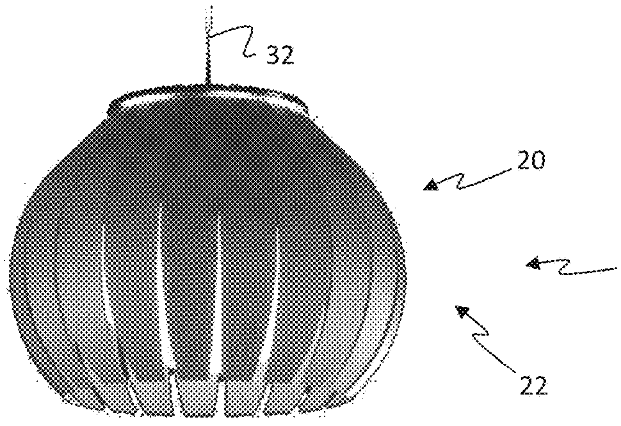
FIG. 15 is a first graphic illustration of a light fixture having a petal mechanism, according to another embodiment of the present invention.
Figure 16:
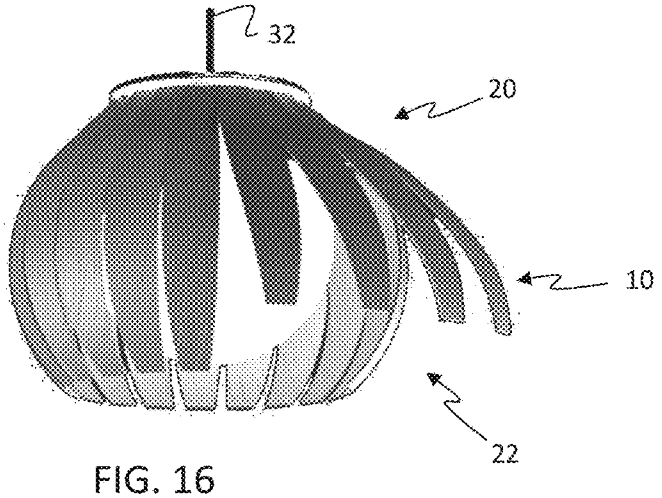
FIG. 16 is a second graphic illustration of the light fixture of FIG. 15.
Figure 17:
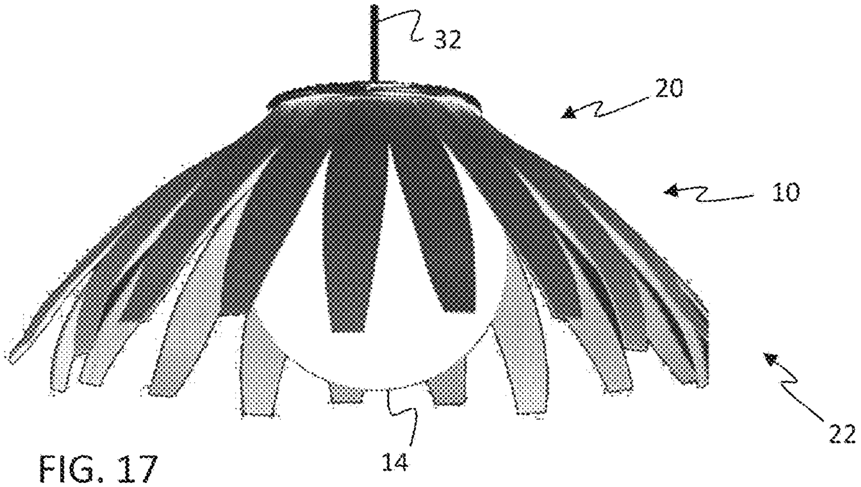
FIG. 17 is a third graphic illustration of the light fixture of FIG. 15.

In other embodiments, the petals 22 may be lowered/raised in a non-synchronous manner. For instance, in another embodiment, one or more petals 22 on one side of the light fixture 10 may start to rise (from the second position) first and then adjacent petals 22 on both sides of the one or more petals 22 start to rise. In yet another embodiment, one or more petals 22 on one side of the light fixture 10 may start to rise (from the second position) first and then an adjacent petal 22 on one of the sides of the one or more petals 22 may start to rise (as shown in FIGS. 15-17). In these embodiments, the cylindrical ring 38 and base 40 may be configured to raise/lower a leading or top edge 46 in a pattern to provide the desired movement. In other embodiments, a motor or other actuator may be provided for each petal 22 to raise and/or lower the respective petal 22 according to a preset set or desired pattern.

Returning to FIGS. 7-14, in the illustrated embodiment, the petal actuator 30 includes a stepper motor 48 and a lead screw 50. The lead screw 50 is coupled to the stepper motor 48. The stepper motor 48 is controlled by a controller or microcontroller (not shown) to rotate the stepper motor 48 in first and second directions. When the stepper motor 48 is being rotated in the first direction, the petal mechanism 20 is configured to move the petals 22 from the closed position to the open position. When the stepper motor 48 is being rotated in the second direction, the petal mechanism 20 is configured to move the petals 22 from the open position to the closed position.

The petal actuator 30 includes a plurality of connecters 52 positioned beneath the ring base 40. The petal actuator 30 further includes a lead screw nut 54, a nut housing 56, an anti-backlash spring 58, and a second lead screw nut 60. The anti-backlash spring 58 dampens any motion in an opposite direction when the stepper motor 48 stops moving.

In the illustrated embodiment, the lead screw 50 is fixed to, and is rotated by, the stepper motor 48. As the lead screw 50 rotates, the lead screw nuts 54, 60 and all attached parts, including the cylindrical ring 38, the base 40, the connectors 52, the nut housing 56, and the anti-backlash spring 58 do not rotate, thus travel up and down the lead screw 50 (depending on the direction of rotation of the stepper motor 48). The traveling parts (38, 40, 52, 54, 56, 58, 60) are mostly prevented from rotating by inertia, but also by two (2) or three (3) bolts 62 (only one of which is shown) that connect the top plate 34 to the diffuser 14.

The stepper motor 48 is fixed to the top plate 34 and turns the lead screw 50 in a clockwise or a counterclockwise direction in a precise number of steps. The lead screw 50 is fixed to the stepper motor 48 and provides the path for the rest of the petal actuator 30 to travel. The cylindrical ring 38 is in contact with the proximal end of each petal 22 in order to raise/lower the petal 22. The cylindrical ring 38 rests on the base 40. The connectors 52 attach the ring base 40 to the screw nut housing 56. The connectors 52 are arranged more closely to the center of the lead screw 50, allowing the traveling parts of the petal actuator 30 that are below the ring base 40 to fit inside of the opening of the diffuser 14.

The lead screw nut 54 fits on the lead screw 50 and drives the petal actuator 30 up and down as the lead screw 50 is turned by the stepper motor 48. The lead screw nut 54 is held in place by the nut housing 56, which also gives the connectors 52 a better surface/material to which to connect.

Depending on the amount of friction between the lead screw 50 and the lead screw nut 54 (which is a function of the weight of the petals 22, the quality/precision of the parts, and lubrication) the force of gravity can be enough to turn the lead screw 50 and the stepper motor 48 when power is not supplied to the stepper motor 48.

The anti-backlash spring 58 provides constant force on the second nut 60, which is confined to the nut housing 56, but is not attached to the nut housing 56. In other words, the second nut 60 beneath the anti-backlash spring 58 has a tiny amount of play relative to the nut housing 56. The force from the anti-backlash spring 58 provides enough friction between the lead screw 50 and the second nut 60 to prevent the lead screw 50 from turning or "slipping".

Figure 13:
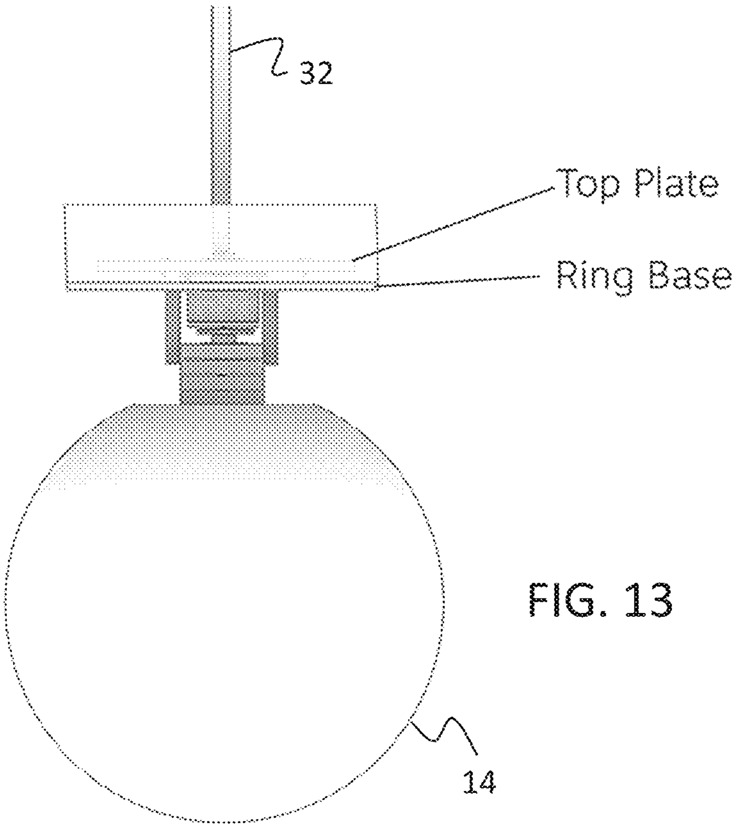
FIG. 13 is a first side view of a portion of the petal mechanism and a diffuser of FIG. 1.
Figure 14:
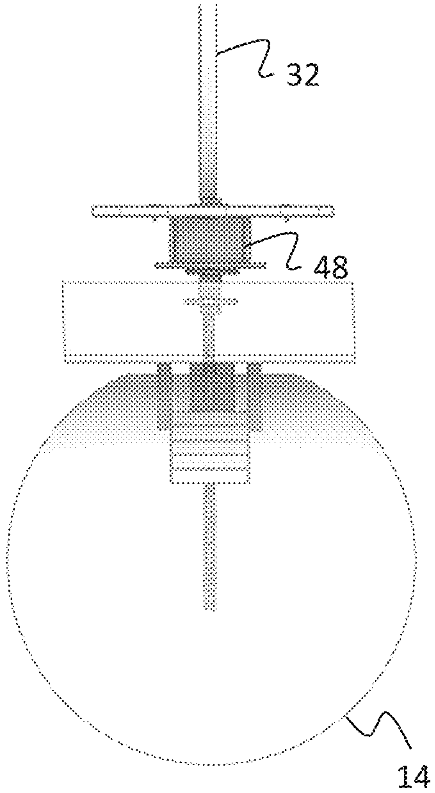
FIG. 14 is a second side view of the portion of the petal mechanism and diffuser of FIG. 13.

With specific reference to FIGS. 13 and 14, a portion of the petal actuator 30 may be positioned within the diffuser 14 and a portion of the petal actuator 30 may be positioned outside of the diffuser 14. In the illustrated embodiment, when the petal mechanism 20 is in the closed position (as shown in FIG. 14), the portions of the petal actuator 30 below the ring base 40 may be located within the diffuser 14.

In another embodiment of the present invention, the light fixture 10 includes one or more Hall effect sensors 70A, 70B that may be used to prevent the petal mechanism 20 from traveling too high or too low along the lead screw 50. In the illustrated embodiment, the petal mechanism 20 includes a top Hall effect sensor 70A and a bottom Hall effect sensor 70B. The Hall effect sensors 70A, 70B detect the presence of a magnet (not shown) embedded within the nut housing 56. When the nut housing 56 travels to the top or bottom of the lead screw 50, the corresponding Hall effect sensor 70A, 70B sends a signal to the microcontroller which stops the stepper motor 48. This prevents the petal actuator 30 from traveling too high or too low.

In another embodiment of the present invention, the petal mechanism 20 may include a planetary gear box 72 and/or a constant tension device 74. The planetary gear box 72 and constant tension device 74 may be utilized with a back-drive, whereby the force of gravity on the petals 22 turns the unpowered stepper motor 48. The planetary gearbox 72 may be used to create a gear reduction which increases the resting torque. The constant tension device 74 may sit attached to the bottom of the nut housing 56 and may be tightened/loosened to add friction. The petal mechanism 20 may include one or both (or neither) of the planetary gear box 72 and the constant tension device 74.

In another embodiment of the present invention, the light fixture 10 with the petal mechanism 20 may be controlled externally through a software application or "app" being run an external device such as a cell phone, tablet computer, or other computing device. The app may communicate with an onboard controller (not shown) to control the stepper motor 48 to open/close the petal mechanism 20. In addition, the app may be used to control other parameters of the light fixture, e.g., the intensity of the light being emitted, the color of the light being emitted, and/or the speed at which the petal mechanism 20 is opened or closed.

In another embodiment of the present invention, the app may utilize one or more preset or programmed modes. Each mode may have a set of predetermined values for one or more of the parameters of the light fixture 10. The app may automatically control the light fixture 10 to set the petal mechanism 20 and/or the lamp 12 to the preset values defined in one of the modes, automatically (for example, based on time of day and/or other parameters), or when a mode is selected via the app by a user.

In another embodiment, or in addition, the light fixture 10 may be controlled via a wall mounted unit (not shown).

Figure 18:
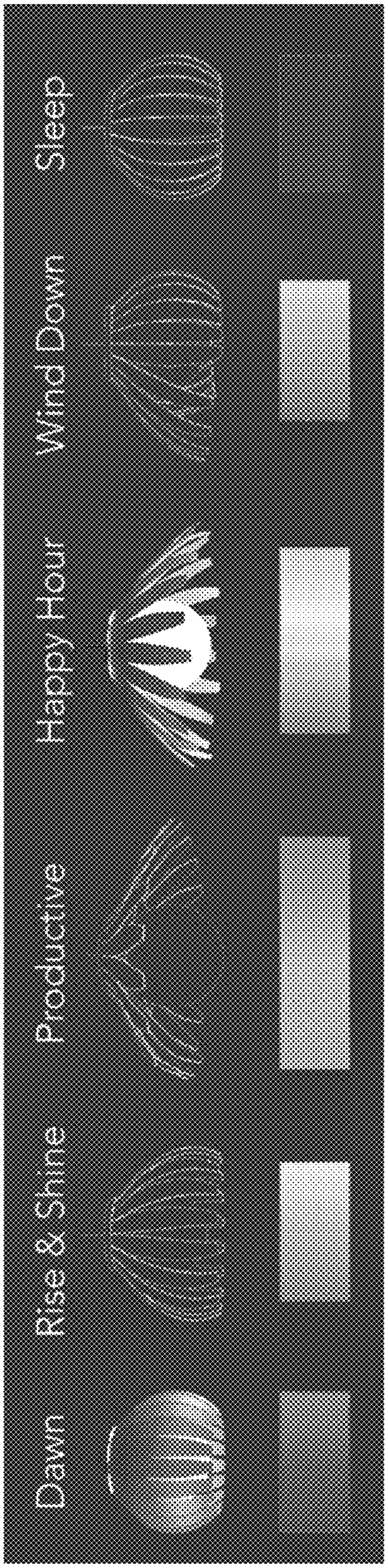
FIG. 18 is an operational mode graphic associated with the light fixture of FIG. 15.

For instance, with reference to FIG. 18, the app and/or wall mounted unit may include a number of predetermined modes, including, but not limited to, Dawn, Rise & Shine, Productive, Happy Hour, Wind Down, and Sleep modes. Each mode has a respective set of predefined parameters of the light fixture 10. In one embodiment of the present invention, a user may select a desired mode. In another embodiment, the light fixture 10 may enter or switch to a mode based on an external parameter, e.g., day and/or time, or amount of sensed ambient light, sound, and/or the presence or absence of people within the room.

In yet another embodiment, or in addition, the lamp fixture 10 may be provided with a series of switch or other control devices, located thereon (not shown) to communicate directly with or control the light fixture 10 and/or the stepper motor 48.

Figure 19:
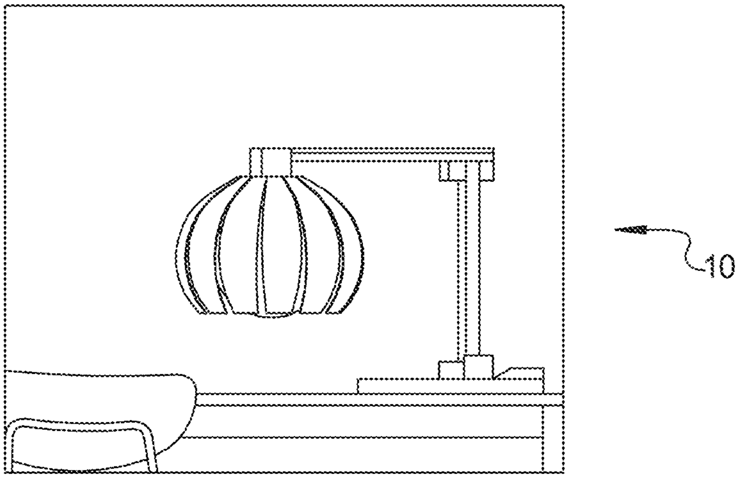
FIG. 19 is a first illustration of a light fixture, according to a third embodiment of the present invention.
Figure 20:
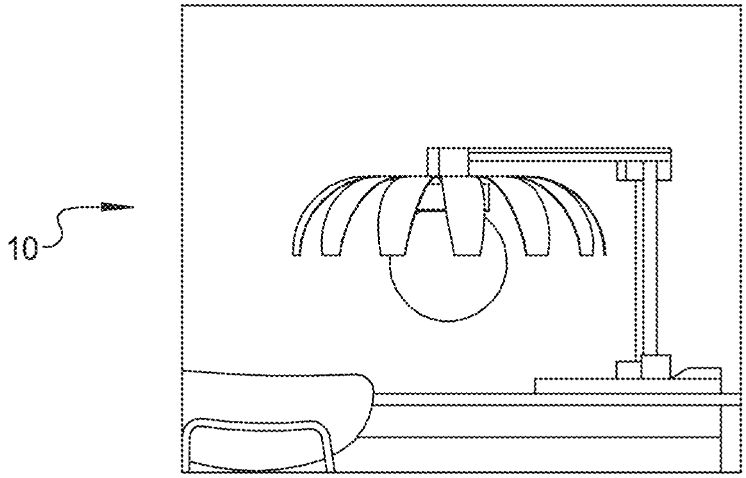
FIG. 20 is a second illustration of the light fixture of FIG. 19.
Figure 21:
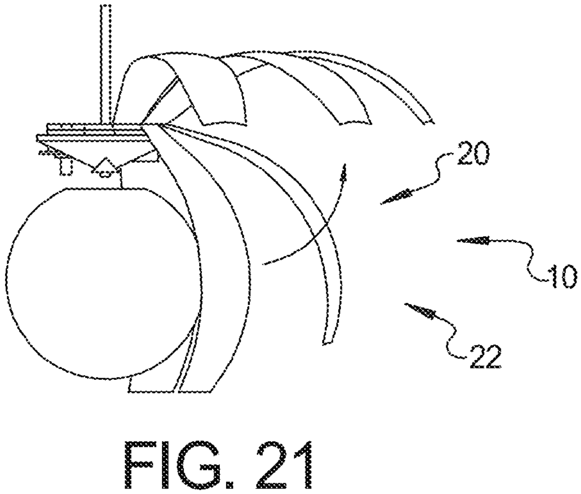
FIG. 21 is an illustration of the light fixture of FIG. 19 in operation.

The light fixture 10 may be provided in different configurations. For example, the light fixture 10 may be provided as a floor lamp, a pendant or hanging lamp, a desk lamp (shown in FIGS. 19 and 20), or any configuration or lamp type.

The light fixture 10 of the present invention sits at the intersection of smart lighting and art to create a novel lighting experience. The petal mechanism 20 has its roots in nature and may be used to provide optimal light or light conditions for desired use, e.g., comfort, focus, or work. The light fixture 10, using the petal mechanism 20, has the ability to alter the shape, and thus the opacity of its shade through the movement of the petals 22. The light fixture 10 may be configured to automatically reacts to changing conditions, e.g., the amount of ambient light in a room. In one embodiment of the present invention, the app provides a matrix of output parameters of the light fixture 10, using, e.g., the modes, including petal configuration (or position), light color, and/or light intensity.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A light fixture comprising:

a lamp having a light source;

a petal mechanism coupled to the lamp and having a plurality of petals and being moveable between an open position and a closed position;

a petal actuator coupled to the petal mechanism to controllably move the petals of the petal mechanism between the open position and the closed position; and wherein the petal actuator includes a top plate, a motor coupled to the top plate, a lead screw coupled to the motor, and a cylindrical ring along an axis of the lead screw and coupled to the lead screw, wherein the petal actuator controllably raises and lowers the cylindrical ring along the axis to move the petals between the open position and the closed position.

2. A light fixture as set forth in claim 1, wherein the petal actuator includes a cone coupled to the lead screw that works against a proximal end of each of the petals.

3. A light fixture as set forth in claim 1, wherein the petal mechanism includes at least one of a planetary gear mechanism to create a gear reduction and a constant tension device to add friction.

4. A light fixture comprising:

a lamp having a light source;

a petal mechanism coupled to the lamp and having a plurality of petals and being moveable between an open position and a closed position;

a petal actuator coupled to the petal mechanism to controllably move the petals of the petal mechanism between the open position and the closed position;

wherein the petal actuator includes a top plate; and wherein the petal actuator includes a plurality of hinges to couple the top plate to each of the petals.

5. A light fixture as set forth in claim 4, wherein the petal actuator includes a cylindrical base ring along an axis.

6. A light fixture as set forth in claim 5, wherein the petal actuator includes a ring base.

7. A light fixture as set forth in claim 6, wherein the motor is a stepper motor controlled by a controller to rotate the stepper motor in a first direction and a second direction.

8. A light fixture as set forth in claim 7, including a plurality of connectors positioned beneath the ring base to attach the ring base to a screw nut housing.

9. A light fixture as set forth in claim 8, wherein the petal actuator includes a screw nut housing and a first lead screw nut disposed in the screw nut housing and coupled to the lead screw to drive the petal actuator up and down as the lead screw is turned by the stepper motor and the screw nut housing.

10. A light fixture as set forth in claim 9, wherein the petal actuator includes a second lead screw nut confined by the screw nut housing and an anti-backlash spring to provide a constant force on the second lead screw nut.

11. A light fixture comprising:

a lamp having a light source;

a petal mechanism coupled to the lamp and having a plurality of petals and being moveable between an open position and a closed position;

a petal actuator coupled to the petal mechanism to controllably move the petals of the petal mechanism between the open position and the closed position;

wherein the petal actuator includes a motor to move the petals;

wherein the petal actuator includes a lead screw coupled to the motor; and a top Hall effect sensor and a bottom Hall effect sensor to prevent the petal mechanism from traveling too high or too low along the lead screw.

12. A light fixture comprising:

a lamp having a light source;

a petal mechanism coupled to the lamp and having a plurality of petals and being moveable between an open position and a closed position;

a petal actuator coupled to the petal mechanism to controllably move the petals of the petal mechanism between the open position and the closed position, wherein the petal actuator comprises a motor, a lead screw coupled to the motor, and a cone coupled to the lead screw that works against a proximal end of each of the petals to move the petals; and a top Hall effect sensor and a bottom Hall effect sensor to prevent the petal mechanism from traveling too high or too low along the lead screw.

13. A light fixture as set forth in claim 12, wherein the petal actuator includes a top plate and a plurality of hinges to couple the top plate to each of the petals.

14. A light fixture as set forth in claim 13, wherein the petal actuator includes a cylindrical base ring along an axis, a ring base, and a plurality of connectors positioned beneath the base ring to attach the ring base to a screw nut housing.

15. A light fixture as set forth in claim 14, wherein the motor is a stepper motor controlled by a controller to rotate the stepper motor in a first direction and a second direction.

16. A light fixture as set forth in claim 15, wherein the petal actuator includes a screw nut housing and a first lead screw nut disposed in the screw nut housing and coupled to the lead screw to drive the petal actuator up and down as the lead screw is turned by the stepper motor and the screw nut housing.

17. A light fixture as set forth in claim 16, wherein the petal actuator includes a second lead screw nut confined by the screw nut housing and an anti-backlash spring to provide a constant force on the second lead screw nut.

18. A light fixture comprising:

a lamp having a light source;

a petal mechanism coupled to the lamp and having a plurality of petals and being moveable between an open position and a closed position;

a petal actuator coupled to the petal mechanism to controllably move the petals of the petal mechanism between the open position and the closed position, wherein the petal actuator comprises a stepper motor, a lead screw coupled to the stepper motor, and a cone coupled to the lead screw that works against a proximal end of each of the petals to move the petals; and a screw nut housing, a first lead screw nut disposed in the screw nut housing and coupled to the lead screw to drive the petal actuator up and down as the lead screw is turned by the stepper motor and the screw nut housing, a second lead screw nut confined by the screw nut housing, and an anti-backlash spring to provide a constant force on the second lead screw nut.

* * * * *